United States Patent
Robert

(10) Patent No.: US 7,075,452 B2
(45) Date of Patent: Jul. 11, 2006

(54) PROCESS FOR READING ELECTRONIC LABELS BY IDENTIFICATIONS OF THEIR CODE BY BLOCK OF BITS

(75) Inventor: Gérard Robert, Poisat (FR)

(73) Assignee: Commissariat A L'Energie Atomique, Paris (FR)

( * ) Notice: Subject to any disclaimer, the term of this patent is extended or adjusted under 35 U.S.C. 154(b) by 540 days.

(21) Appl. No.: 10/233,520

(22) Filed: Sep. 4, 2002

(65) Prior Publication Data

US 2003/0132834 A1    Jul. 17, 2003

(30) Foreign Application Priority Data

Sep. 5, 2001   (FR) .................................. 01 11476

(51) Int. Cl.
*H02J 13/00*    (2006.01)
(52) U.S. Cl. ............................ 340/825.52; 340/825.53; 340/10.52; 340/825.49; 340/572.1; 340/572.2; 340/572.4; 340/10.1; 340/10.2; 340/10.3
(58) Field of Classification Search ............... 340/3.52, 340/825.53, 10.52, 825.49, 572.1, 572.2, 340/572.4, 10.1, 10.2, 10.3, 825.52, 825.69, 340/825.72; 342/44
See application file for complete search history.

(56) References Cited

U.S. PATENT DOCUMENTS 5,673,037 A * 9/1997 Cesar et al. ............. 340/10.32
6,661,335 B1 * 12/2003 Seal ........................ 340/10.1
6,725,014 B1 * 4/2004 Voegele .................... 455/41.2

FOREIGN PATENT DOCUMENTS

| EP | 0 696 011 | 2/1996 |
|---|---|---|
| EP | 0 942 386 | 9/1999 |
| EP | 1 093 075 | 4/2001 |
| FR | 2 677 135 | 12/1992 |
| FR | 2 776 094 | 9/1999 |

* cited by examiner

*Primary Examiner*—Brian Zimmerman
*Assistant Examiner*—Vernal Brown
(74) *Attorney, Agent, or Firm*—Oblon, Spivak, McClelland, Maier & Neustadt, P.C.

(57) ABSTRACT

The invention concerns a method for reading a set of electronic labels, each comprising a distinct identification code of N bits and situated in the electromagnetic field of an interrogator device, characterized in that it comprises the following steps:

a) for each given code of N bits, defining an elementary analysis block comprising m bits, where m is a sub-unit of N, b) analyzing the code of each label by scrolling through this code, block of m bits by block of m bits, c) and, for a given label, generating a serial number representing the number of labels identified before this label in such a way that the interrogator knows at any moment the number of labels present in the electromagnetic field, d) establishing a cross reference table between the serial numbers generated and the values of the identification codes of each label.

15 Claims, 6 Drawing Sheets

PROCESS FOR READING ELECTRONIC LABELS BY IDENTIFICATIONS OF THEIR CODE BY BLOCK OF BITS

TECHNICAL FIELD

The invention concerns a method for reading a set of electronic labels, each comprising a distinct identification code of N bits and situated in the electromagnetic field (EM) of an interrogator device.

The invention also concerns a system for reading a set of labels by an interrogator device, the labels and the interrogator device each comprising signal emitter/receptor means, as well as means for sequencing and means for memorization.

The invention applies, in a general manner, to any transaction between an interrogator paragraph: system and responder systems (more simply called "labels"), for which one does not know, in principle, either the number or the identification codes. In particular, the invention finds applications in the field of recognizing individuals wearing badges, or the medical surveillance of individuals bearing implants, or in the area of counting and controlling objects bearing labels, such as luggage in an airport or products in a production line or even the management of stocks of goods. The invention may apply, more particularly, to the continuous inventory of the contents of a supermarket trolley, in which the buyer can place or remove, at any moment, one or several products.

State of the Prior Art

Many systems and methods for identifying objects bearing labels are presently known to those skilled in the art. Most of them apply to a multiple reading of labels, called "multi-label reading" and propose a re-emission of the label code, after a random time specific to each label, when there is a detection of collision of messages emitted simultaneously by several labels.

Other methods consist in allowing a specific time slot for the response of a label, each time slot being determined in an unequivocal manner by the identification code of each label.

However, these methods do not optimize the transaction time between the interrogator system and the set of labels. Moreover, the time taken by this type of method to read all of the labels may not be deterministic, since it can be based on the sorting of random numbers, in addition to the variety of the number of labels present in the electromagnetic field of the reading device.

Moreover, methods exist that propose a systematic and deterministic reading of the identification codes of labels. One of these methods is, in particular, described in patent application FR-A-2 677 135.

According to this method, in response to a command signal from the interrogator device, the labels present in the electromagnetic field of this interrogator device supply their identification code successively, bit by bit, up to the point where it is fully identified. When a label detects that the code being identified is different to its own code, it inhibits itself momentarily, in other words it becomes silent, in such a way that the identification cycle continues with the other labels, up to the point where there is only one non inhibited label. The code of this label is then identified. At the end of the identification cycle, on a single command from the interrogator device, the identified label inhibits itself definitively and the other labels lift their momentary inhibition. The identification procedure is then re-initialised in order to identify another label. These operations are repeated up to the point where all of the labels are identified separately.

Moreover, patent application FR-A-2 776 094 describes a method intended to improve the technique described previously by reducing the acquisition time of the codes. This method proposes economizing the number of messages exchanged between the interrogator device and the labels by scrolling through a search tree. In this case, the detection of the identification codes of the labels is carried out successively, one after the other.

Due to the fact that in the methods described above the identification of the code of a label is carried out bit by bit, numerous emissions of commands from the interrogator device are necessary to analyse an entire code of a label. Moreover, these methods do not allow the codes of all the labels present in the electromagnetic field of the interrogator device to be identified simultaneously.

The aim of the invention is to overcome the disadvantages of the techniques described previously by reducing the number of messages emitted by the interrogator device.

A further aim of the invention is to provide several modes of analyzing the codes of labels, taking account of the envisaged application and the constraints linked to this application.

DESCRIPTION OF THE INVENTION

The method according to the invention comprises the following steps:

(a) for each given code of N bits, defining an elementary analysis block comprising m bits, where m is a sub-unit of N greater than 1, (b) analyzing the code of each label by scrolling through this code, block of m bits by block of m bits, (c) assigning a same serial number to all of the labels with the same partially identified code on the row being analysed, the number of serial numbers assigned representing the number of groups of labels with the same partially identified code, (d) establishing a cross reference table between each serial number and the value of the partially identified code.

According to the invention, the serial numbers are consecutive to each other.

According to the invention, the serial numbers of the labels are updated as the detection of the bits of the identification codes proceeds.

According to the invention, the method comprises a stage that consists in verifying, after all of the labels present in the electromagnetic field have been identified, the identification codes detected by a call of all the already listed labels.

According to the invention, the call of all the already listed labels is carried out by means of serial numbers.

According to the invention, the identification of a label is carried out according to a sequential mode in which the codes of blocks of m successive bits of labels are analyzed label by label by scrolling through a search tree from a row of block of bits up to the last row of block of bits for each code.

According to the invention, the sequential mode comprises two variants, a first variant, called systematic variant, where after the identification of a label, the analysis of the tree is taken up again at the first block of m bits, a second variant, called deep mode, where after identification of a label the analysis of the tree is carried out from the highest row k, where at least two values of m bits have been detected.

One can moreover imagine going back up any junction or even any row.

According to the invention, the identification of a label is carried out according to a parallel mode in which the blocks of m bits of the same row are analyzed for all the labels.

According to the invention, the parallel mode comprises two variants, a first variant, called wide mode, in which the analysis of a row k+1 from a row k is carried out by consecutively interrogating each partial serial number, and a second variant, called simultaneous mode, in which the analysis of a row k+1 from a row k is carried out in two phases, i.e. a first phase in which all of the labels of all of the serial numbers indicate the value of their $(k+1)^{th}$ block and a second phase in which the $(k+1)^{th}$ block is analyzed if all of the labels do not have the same block at row k+1.

The method according to the invention is implemented by a system for reading a set of labels by means of an interrogator device, the labels and the interrogator device comprising signal emitter—receptor means linked via modulation/demodulation means to sequencing means, and means for memorising linked to said sequencing means.

According to the invention, the interrogator device moreover comprises means for analyzing each label block of m bits by block of m bits, and calculating, for each label, a serial number representing the number of labels identified before said label in such a way that said interrogator knows at any moment the number of labels present in the electromagnetic field, and a first memory intended to memorize a cross reference table between the serial numbers and the identified codes, each label also comprising means for calculating the serial numbers, and means for memorizing said serial numbers.

Said means for analysing each label consist in algorithms capable of operating according to two modes:

a sequential mode, in which the codes of blocks of m successive bits of labels are analysed label by label by scrolling through a search tree from a row of block of bits up to the last row of block of bits for each code, or a parallel mode, in which the blocks of m bits of the same row are analyzed for all of the labels before analyzing the blocks of the following row.

DETAILED DESCRIPTION OF SPECIFIC EMBODIMENTS

The method of the invention consists in a reader of identification codes of a set of labels present in the electromagnetic field of an interrogator device. In the embodiment example described hereafter, the identification codes are binary, all different to each other, and have a same known length. Thus, throughout the description that follows, we will consider that each identification code of a label contains N bits, where N is a whole number.

The method for identifying codes of labels is carried out, according to the invention, by analysis successive blocks of m bits, row of block of m bits by row of block of m bits, by scrolling through a binary search tree, each branch of which represents the value of a block of m bits. Two branches representing two blocks, having at least one different bit, are connected via a node.

The search tree may be followed by going from the block of bits with the highest value to the block of bits with the lowest value, or inversely, both routes leading to two completely symmetrical methods.

The method of the invention thus proposes determining all of the blocks of bits making up the codes of the labels, row of block of m bits by row of block of m bits, where the row of block of m bits is the current position of the pointer of blocks of m bits making up the identification code currently being read.

Figure 1:
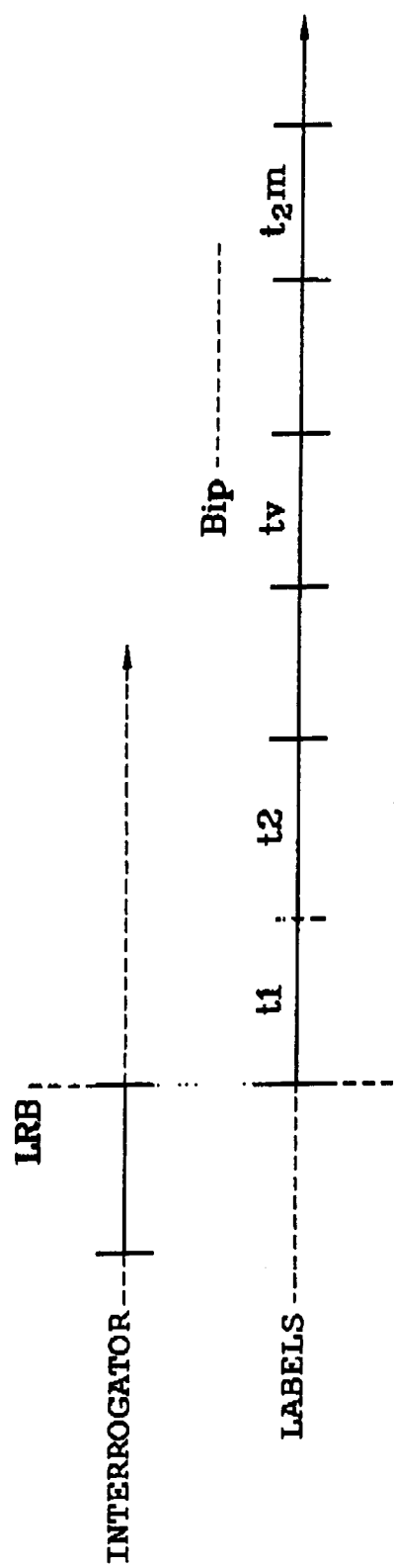
FIG. 1 represents a timing diagram illustrating the information exchange sequences between the interrogator device and a label.

At each row of block, the labels analysed emit the value of the bits making up the block of this row. In order to do this, as illustrated in FIG. 1, one defines $2^m$ contiguous time slots.

The labels emit a "BIP" in the time slot $2^v$ corresponding to the value v of the block of m bits currently being analysed.

Two situations are then possible:

either one only of the time slots is occupied and the value of the block of m bits is known for the row k analysed, and one can move onto row k+1.

or several time slots are occupied and either a value should be selected and the analysis continued on row k+1 in the sequential mode, or reassigning serial numbers to the row k before continuing the analysis at the row k+1 in the parallel mode.

In other words, the method of the invention consists in scrolling through the binary tree, row of block of m bits by row of block of m bits, in order to determine if there is a collision of blocks of m bits or not, in other words if there is a possibility of new codes. A collision is generated by assigning a distinct serial number to each label or group of labels with the same code beginning. The serial numbers allow, at each row of block of m bits, the maximum number of possible codes present on this row to be determined, taking account of all the possible assumptions.

The serial numbers allow, in the preferred embodiment of the invention, to call up all of the labels in order to be able to eliminate the invalid assumptions and thus determine the real list of identification codes.

Figure 2:
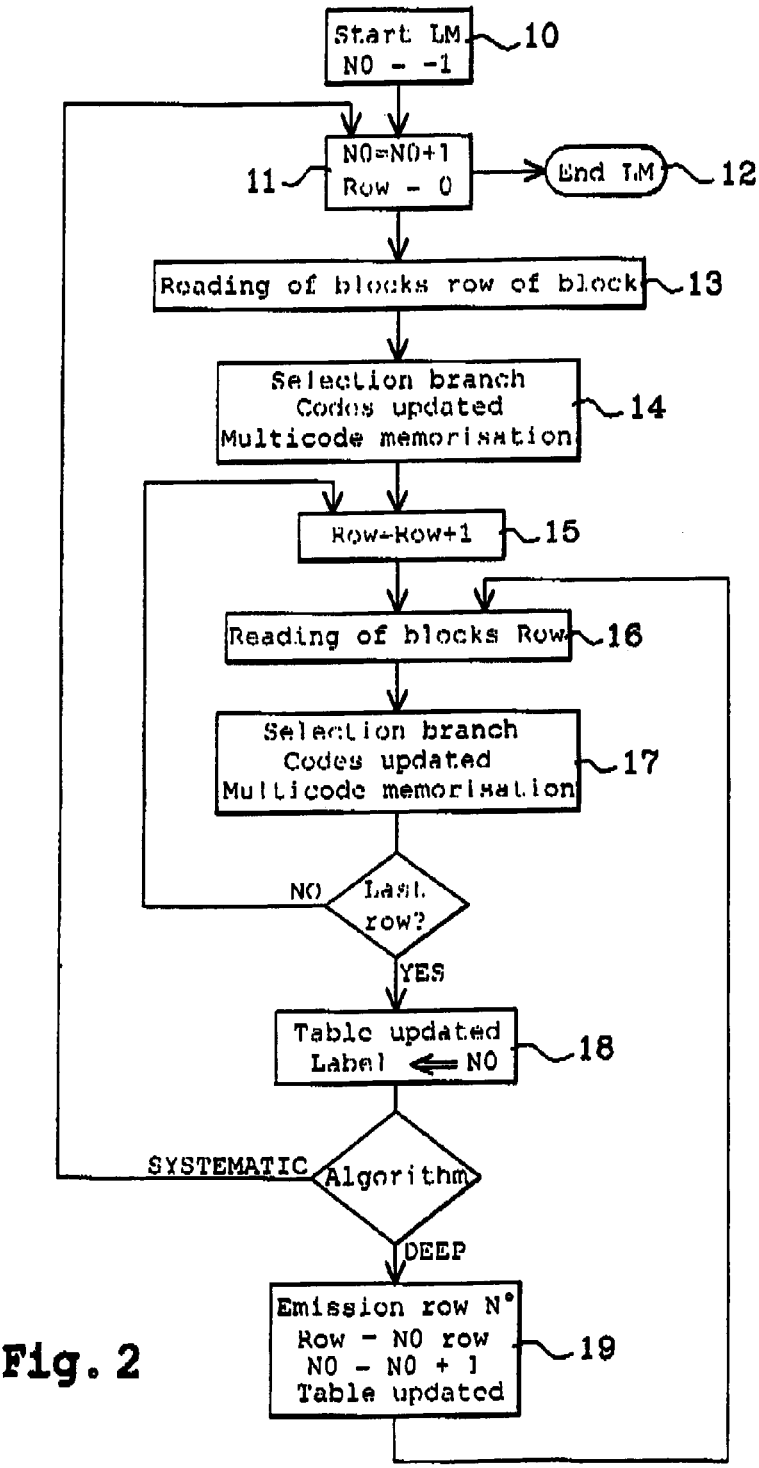
FIGS. 2 and 3 represent the functional diagram of the method of the invention for a sequential mode and a parallel mode respectively.

FIG. 2 represents a functional diagram of the method of the invention for sequential modes. Stage 10 is the start of the sequencing. The serial number NO under analysis is initialised at −1, all of the labels present in the electromagnetic field of the reader emit the value of the first block of m bits identifying them. A label entering the electromagnetic field after this stage and before the end of the identification cycle will not participate in this identification cycle. It will remain silent while awaiting a new message of the beginning of the reading cycle.

At stage 11, the serial number NO is incremented, the row of block of bits is initialised at zero. Stage 13 of reading this first row consists in knowing the value(s) of the blocks of m bits of this first row. Several configurations are possible:

no response: move onto stage 12 "end of algorithm".

at least one response: move onto stage 14. The interrogator selects among the values present the branch that is going to be analyzed, updates the code and, if the number of values found is greater than 1, memorizes that there are several codes on the row being analyzed.

At stage 15, one moves onto the next analysis row: only the labels belonging to the pathway selected by the reader since the start of the analysis of the tree up to row k send the value of the $(k+1)^{th}$ block of m bits.

Stages 16 and 17 are respectively identical to stages 13 and 14: only the row number analyzed is different. These stages are carried out as long as the last row has not been analyzed.

Stage 18 marks the end of the identification of a label: the reader updates the cross reference table serial number ↔identification code, the label identified assigns itself the serial number NO underway.

If the algorithm underway is the systematic algorithm, the analysis goes back to stage 11 and all of the unidentified labels participate in the sequence.

For the deep algorithm, one activates stage 19, where the reader searches in the multicode memorisation register the highest row where several responses have been received; it indicates to the labels the row from which the analysis restarts; the serial number is incremented and in the cross reference table it recopies the value at the address NO-1 in the address NO. The process moves onto stage 16, where only the labels belonging to the pathway selected by the reader from row O up to the current row emit the value of their block of the current row.

Figure 3:
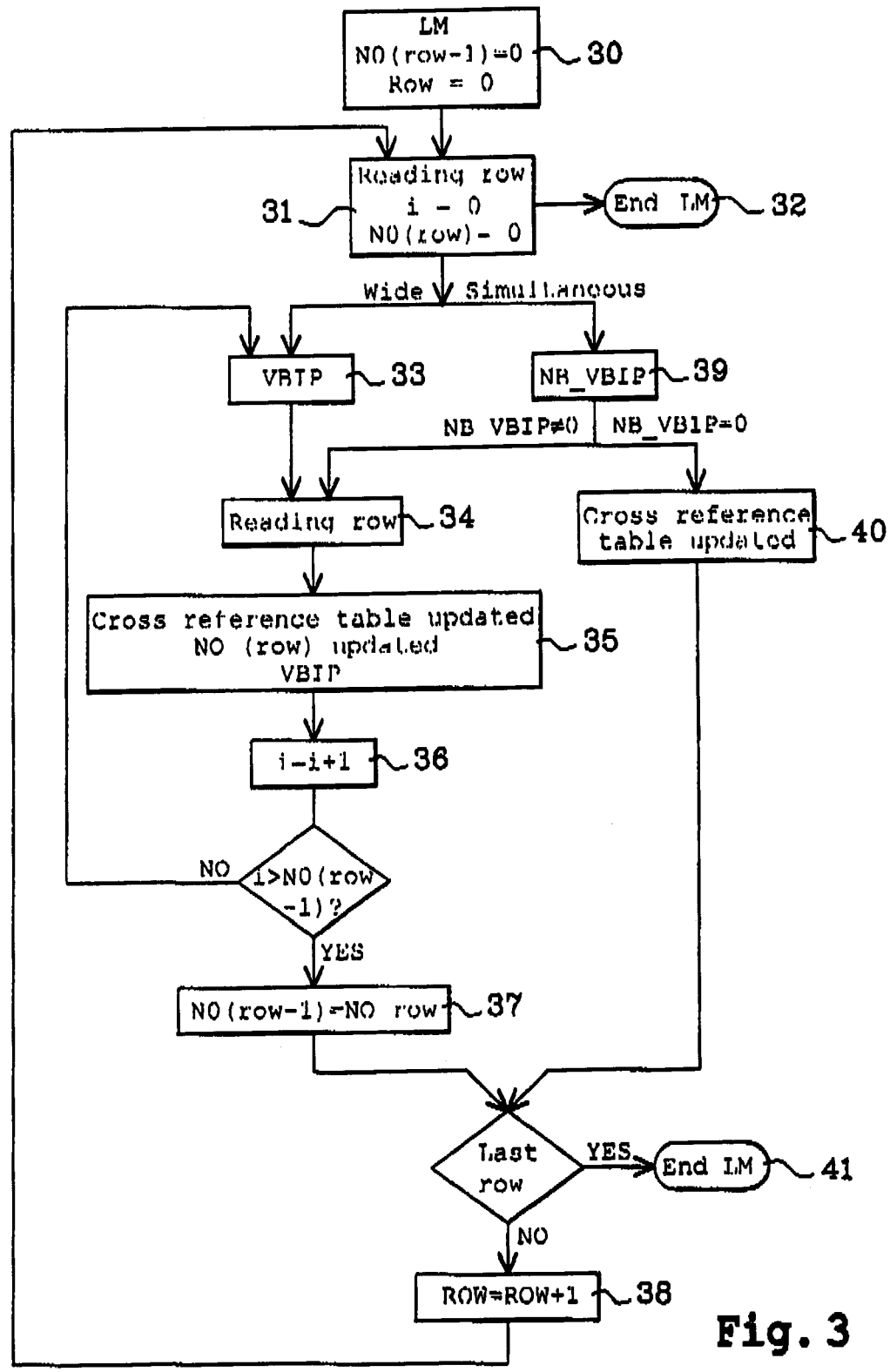

FIG. 3 represents a functional diagram of the method of the invention for the parallel modes. Stage 30 is the start of the sequencing: the number of partial serial numbers of the previous row NO (row −1) is initialised at 0, as well as the ROW counter of the row of m bits currently being analysed. All of the labels present in the electromagnetic field of the interrogator emit their first block of m bits. A label penetrating the electromagnetic field after this stage and before the end of the identification cycle will not participate in this identification cycle. It will remain silent while awaiting a new message of the start of a reading cycle.

Stage 31 of the row reading consists in knowing all of the values of blocks of m bits of the row being analyzed. In this phase, an index i and the counters of partial serial numbers NO (row) of the row currently being analyzed are initialised at zero.

If no label replies, the analysis sequence ends at stage 32: end LM.

If not, in the case of the wide algorithm, the interrogator at stage 33 indicates to the labels the values found in stage 31 and the algorithm continues to stage 34.

In the case of the simultaneous algorithm, the interrogator in stage 39 confirms the values received in stage 31. If all of the labels have emitted the same value, the interrogator emits a command NB_VBIP=0, updates the cross reference table at stage 40 and moves on to the test "last row". If not, the interrogator indicates for NB_VBIP≠0 the values received and the algorithm continues through stage 34.

Stages 34, 35, 36 and 37 are common to the two parallel modes: they consist in successively analysing all of the serial numbers present on the row preceding the row currently being analysed.

At stage 34, only the labels having the serial number i on the previous row emit their value.

Stage 35 is used by the interrogator to update the partial serial number counter NO (row) of the row currently being analysed, in order to update the cross reference table; through the emission of the command VBIP, the reader indicates to the labels the values read at stage 34, and the labels update their partial serial number for the row underway.

At stage 36, one increments the analysis index i of the serial numbers of the previous row. If all of these serial numbers have not been analysed, one passes to stage 34. If not, the counter of serial numbers of the previous row NO (row-1) is initialised by NO (row) in stage 37.

If the last row has been analysed, the process stops at stage 41: end LM. If not, the row number is incremented in stage 38 and the analysis of the row starts again at stage 31.

Figure 4:
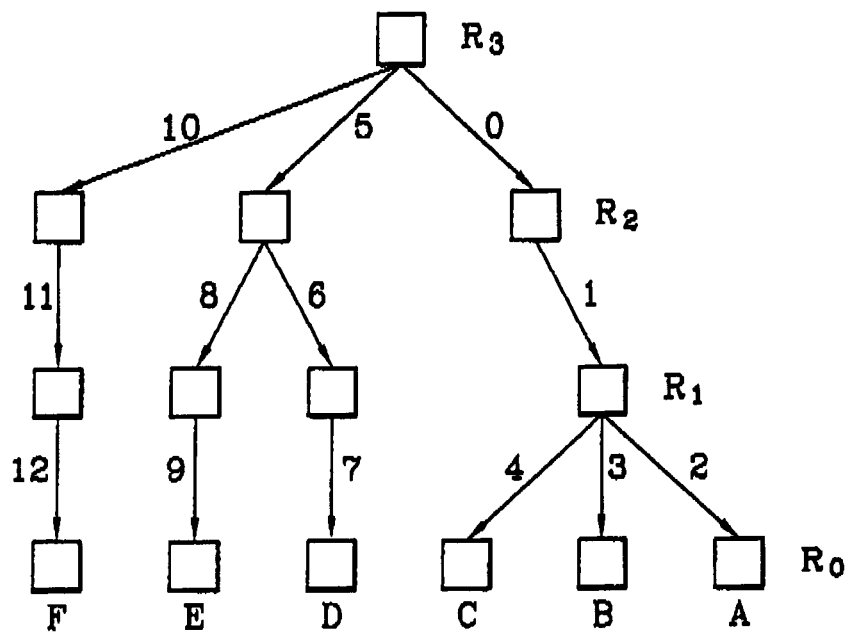
FIGS. 4 and 5 represent examples of tree searches with the process of the invention, and FIGS. 6 and 7 schematically represent an interrogator device and a label of the invention system respectively.

FIG. 4 represents a search tree for identifying the codes of six labels, A, B, C, D, E and F, each comprising N bits.

In this example, the blocks of bits each comprise 4 bits. The successive rows of blocks of bits are designated by the references R0 to R3, where R3 represents the initial level of search corresponding to the root of the search tree in which no code has yet been identified, and the level R0 represents the final search level where all have the codes have been identified.

The identification is carried out label by label by scrolling through the tree from row R3 up to row R0. The codes are identified four bits by four bits.

According to a characteristic of the invention, each label assigns itself a serial number corresponding to the number of labels identified before it. A cross reference table between the serial numbers and the identification codes is established in order to ensure a rapid exchange between the labels and the interrogator after the identification phase.

The following table illustrates the evolution of serial numbers during the tree search according to a first variant of the sequential mode, in which the restart of the analysis of the tree after the identification of a label is carried out from the root.

| Label identified | Branch scrolled | Serial number assigned |
| --- | --- | --- |
| A | 0-1-2 | 0 |
| B | 0-1-3 | 1 |
| C | 0-1-4 | 2 |
| D | 5-6-7 | 3 |
| E | 5-8-9 | 4 |
| F | 10-11-12 | 5 |

At row R3, all of the labels have emitted their first blocks. The interrogator selects one of these. Thus, if one wishes to analyse all of the labels, one may choose, for example, according to increasing values (or decreasing), and if one does not wish to identify all of the labels but instead only verify the presence of a label, one can impose the searched for value. The labels that do not present the selected block inhibit themselves momentarily. The others remain listening for a request from the interrogator in order to emit the following block.

At row R2, the non-inhibited labels emit their second block on request by the interrogator. The interrogator selects one of them and the labels that do not present the second block selected inhibit themselves momentarily. The others remain listening for a request from the interrogator in order to emit the following block. This procedure is repeated up to the last row R0 of the code of N bits.

The row R0 is reached by successively scrolling through the branches 0-1-2, 0-1-3 and 0-1-4 thus respectively permitting the identification of the complete code of the labels A, B and C.

A similar procedure is followed to identify the codes of labels D, E and F.

According to another variant of the sequential mode, the restart of the analysis of the tree after identification of a label is carried out from the row of the last block where the partially identified labels and the identified labels are different to each other. At the level of this row, the analysis tree presents at least two branches corresponding to the blocks that differ by at least one bit.

The following table illustrates the evolution in serial numbers during the tree search according to the second variant of the sequential mode.

| Label identified | Branch scrolled | Serial number assigned |
|---|---|---|
| A | 0-1-2 | 0 |
| B | 3 | 1 |
| C | 4 | 2 |
| D | 5-6-7 | 3 |
| E | 8-9 | 4 |
| F | 10-11-12 | 5 |

As in the first variant, at row R3, all of the labels have emitted their first blocks. The interrogator selects one of these and the labels that do not present the selected block inhibit themselves momentarily. The others remain listening for a request from the interrogator in order to emit the following block.

At row R2, the non-inhibited labels emit their second blocks on request by the interrogator. The interrogator selects one of them and the labels that do not present this second block inhibit themselves momentarily. The others remain listening for a request from the interrogator in order to emit the following block of four bits. This procedure is repeated up to the last block, in other words up to the reading of a complete code of N bits.

Thus, row R0 is reached by successively scrolling through branches 0-1-2, in order to identify the label A, then branch 3 from row R1 in order to identify label B, then branch 4, from row R1, in order to identify label C.

In the same way, the identification of the code of label D is obtained by scrolling through branches 5-6-7, the identification of the code of label E, by scrolling through branches 8-9 from row R2 and that of label F by scrolling through branches 10-11-12 from row R0.

Figure 5:
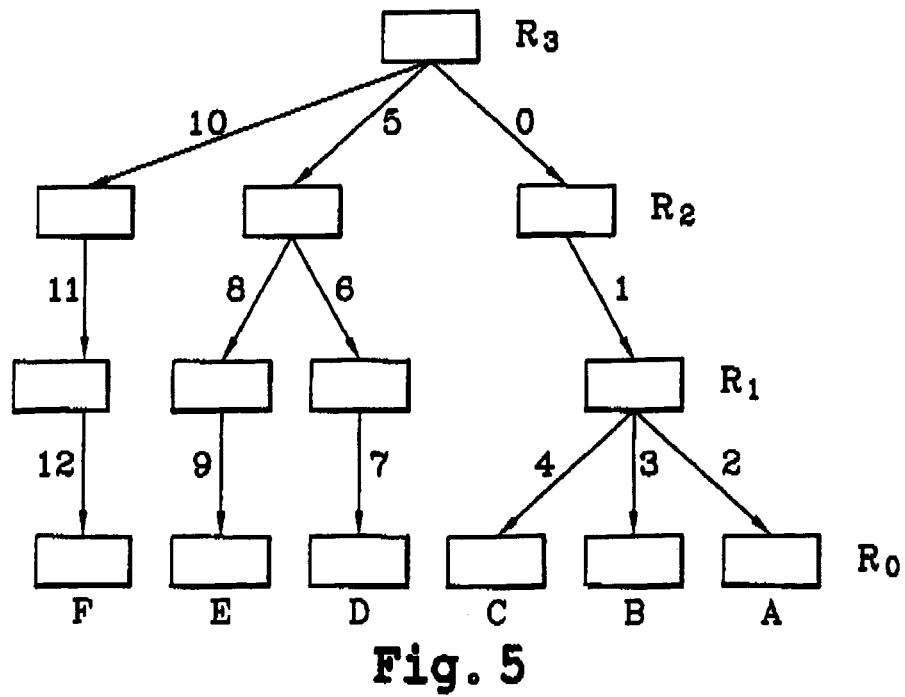
Figure 6:
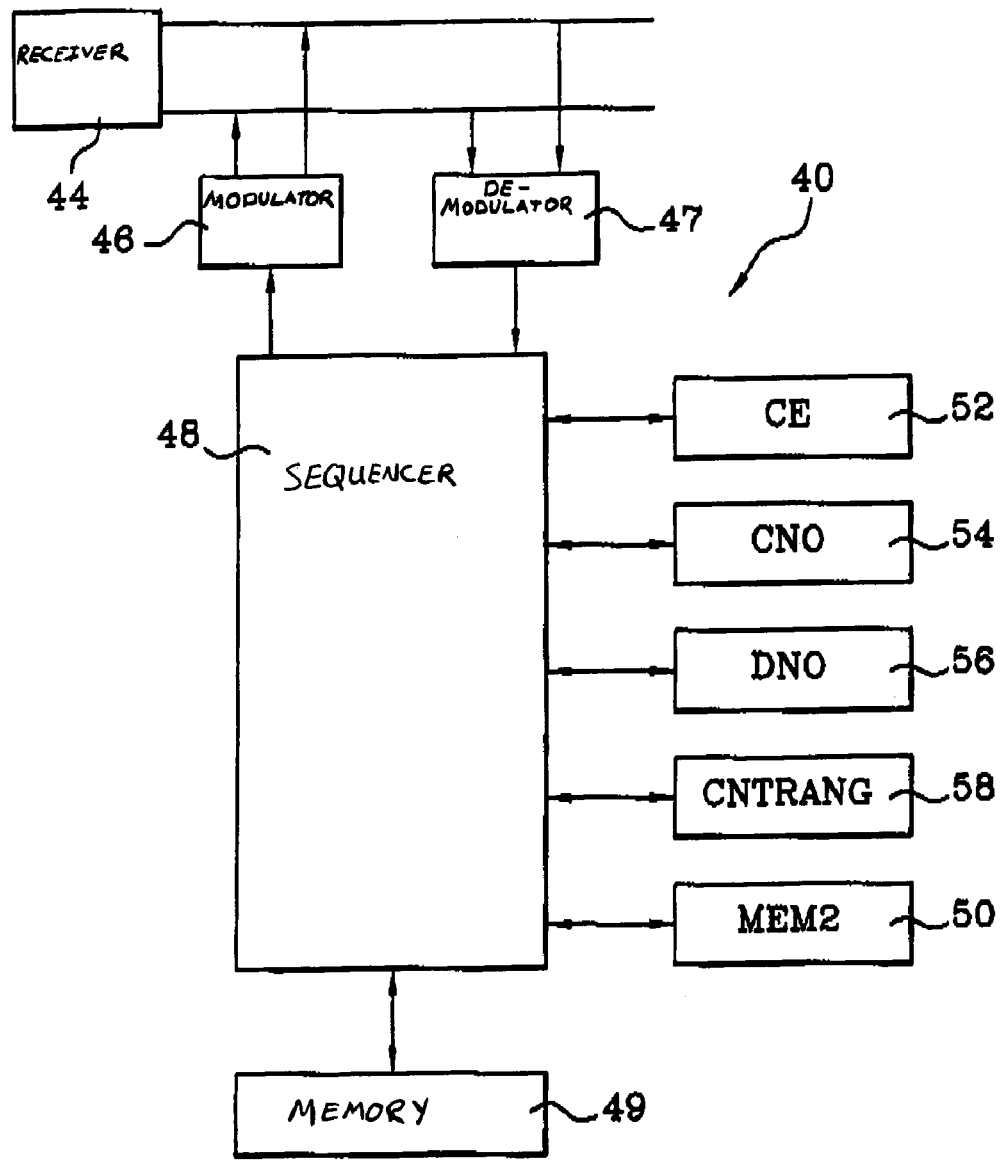

FIG. 5 represents a search tree for identifying the codes of six labels, A, B, C, D, E and F, each comprising N bits according to the parallel mode. The parallel mode comprises two variants, a first variant, called wide mode, in which the analysis of a row k+1 from a row k is carried out by consecutively interrogating each partial serial number, and a second variant, called simultaneous mode, in which the analysis of a row n+1 from a row k is carried out in two phases:

a first phase in which all of the labels of all the serial numbers indicate the value of their $(k+1)^{th}$ block.

and a second phase in which the $(k+1)^{th}$ block is analysed if all of the labels do not have the same block at row k+1.

The example in FIG. 5 will be used successively to describe a wide_2 mode in which the analysis is carried out by sub-blocks of two bits, and a simultaneous_4 mode in which the analysis is carried out by sub-blocks of four bits.

In the two variants, a cross reference table between the serial numbers and the identification codes is established in order to ensure a rapid exchange between the labels and the interrogator after the identification phase.

The evolution of the serial numbers of the labels in the scrolling through of the tree in FIG. 4 is given in the following table:

| Labels $E_t$ | Row 3 | Row 2 | Row 1 | Row 0 |
|---|---|---|---|---|
| Label A | 0 | 0 | 0 | 0 |
| Label B | 0 | 0 | 0 | 1 |
| Label C | 0 | 0 | 0 | 2 |
| Label D | 0 | 1 | 1 | 3 |
| Label E | 0 | 1 | 2 | 4 |
| Label F | 0 | 2 | 3 | 5 |

By designating by $E_t(k)$ the value of the sub-block of row k of a label $E_t$, by NO (k) the serial number at row k, and by X the following sub-blocks not yet identified, the evolution of the cross reference table between the serial numbers NO (k) and the identification codes is as follows:

Row 3
  NO (0)=XXX

Row 2
  NO (0)=A (2) XX
  NO (0)=D (2) XX
  NO (0)=F (2) XX

Row 1
  NO (0)=A (2) A (1) X
  NO (1)=D (2) D (1) X
  NO (2)=D (2) F (1) X
  NO (3)=F (2) F (1) X

Row 0
  NO (0)=A (2) A (1) A (0)
  NO (1)=A (2) A (1) B (0)
  NO (2)=A (2) A (1) C (0)
  NO (3)=D (2) D (1) D (0)
  NO (4)=D (2) D (1) E (0)
  NO (5)=F (2) F (1) F (0)

According to a characteristic of the invention, in the wide mode the cross reference list is updated as the identification of blocks of m bits progresses.

The method described previously is implemented by a system comprising an interrogator device 40 and labels 42 comprising signal emitter—receiver means 44 connected, via modulation/demodulation means 46, 47, to sequencing means 48.

The interrogator device 40 moreover comprises means for analyzing each label 42 block of m bits by block of m bits, and for calculating, for each label 42, a serial number representing the number of groups of labels with the same partially identified code in such a way that said interrogator 40 knows at any moment the number of groups of labels present in the electromagnetic field, a first memory 49 intended to memorize a cross reference table between the serial numbers and the partially identified codes, a first row counter 58 indicating the number of the group of bits currently being analyzed and a second counter 52 indicating the number of labels either totally identified or partially identified. Each label 42 also comprises means for calculating the serial numbers, a first counter 68 to count the row of blocks of bits being analyzed and a first memory 74 to memorized said serial numbers and to store the identification code of the label. Said means for analysing each label are made up of algorithms that function according to two modes:

a sequential mode, in which the codes of the blocks of m successive bits of labels are analyzed label by label by scrolling through a search tree from the first row of block of bits up to the last row of block of bits for each code, or a parallel mode, in which the blocks of m bits of the same row are analysed simultaneously for all of the labels.

The interrogator device operating in deep sequential mode moreover comprises:

a second memory 50 intended to memorize the multiple branch nodes of the analysis tree in the sequential mode, the second counter of labels 52 indicating the number of completely identified labels (this counter 52 also plays this role in the systematic sequential mode).

The interrogator device operating in parallel mode moreover comprises:

a third counter of serial numbers 54 indicating the number of groups of labels identified in the analysis row k+1.

a fourth counter of serial numbers 56 indicating the number of serial numbers processed in the row under analysis for the parallel mode, the second counter of serial numbers 52 indicating the number of groups of labels with the same partially identified code at the analysis row k.

Figure 7:
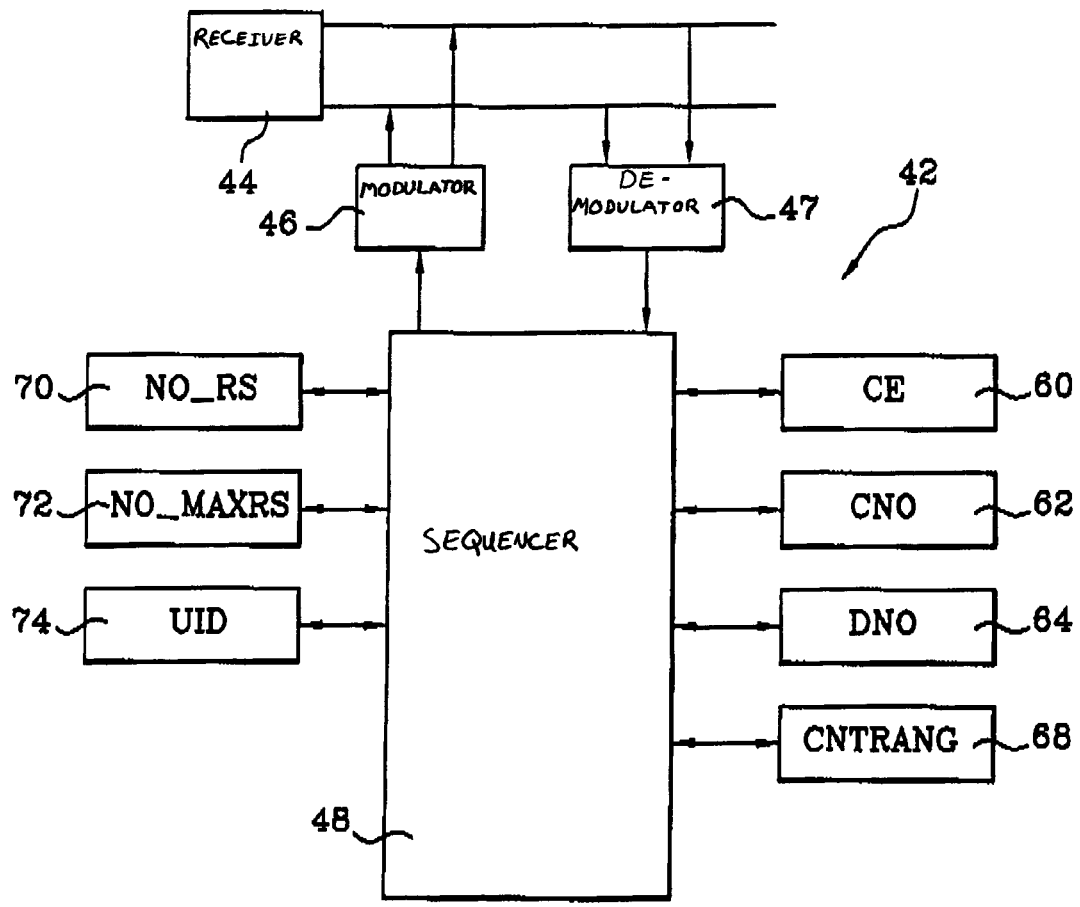

In referring to FIG. 7, each label 42 operating in sequential mode, comprises moreover a second counter of serial numbers 60 intended to count the completely identified labels, and in the case of the deep sequential mode, a second memory of serial numbers 64 to memorize the number of the node at which the label has not been selected.

Each label 42 operating in parallel mode moreover comprises:

a second memory 72 intended to memorize the number of groups with an identical partially identified code at the analysis row k.

a second counter of serial numbers 62 intended to indicate the serial number being analyzed in the parallel mode.

a third memory 70 intended to memorize the serial number assigned to a label during the processing of a row k in the parallel mode.

The invention claimed is:

1. Method for reading a set of electronic labels, each comprising a distinct identification code of N bits and situated in the electromagnetic field of an interrogator device, comprising the following steps:
   (a) for each given code of N bits, defining an elementary analysis block comprising m bits, where m is a sub-unit of N greater than 1,
   (b) analyzing the code of each label by scrolling through this code block of m bits by block of m bits,
   (c) assigning a same serial number to all of the labels with a same partially identified code on a row being analyzed, a number of serial numbers assigned representing a number of groups of labels with the same partially identified code,
   (d) establishing a cross reference table between each serial number and a value of the partially identified code, and
   (e) updating the serial numbers of the label as the detection of the bits of the identification codes progresses.

2. Method according to claim 1, wherein the serial numbers assigned are consecutive to each other.

3. Method according to claim 1 or 2, wherein after all of the labels present in the electromagnetic field have been identified, verifying the identification codes detected by a call of already identified labels.

4. Method according to claim 3, wherein the call of already identified labels is carried out by means of serial numbers.

5. Method according to claim 1 or 2 wherein the identification of a label is carried out according to a sequential mode in which the codes of the blocks of m successive bits of labels are analyzed label by label by scrolling through a search tree from a row of block of bits up to a last row of block of bits for each code.

6. Method according to claim 5, wherein the identification of a label is carried out according to a systematic mode in which, after identification of a label, the analysis of the tree is taken up again at a first block of m bits.

7. Method according to claim 5, wherein the identification of a label is carried out according to a deep mode in which, after identification of a label, the analysis of the tree is carried out from a highest row k where at least two values of m bits have been detected.

8. Method according to claim 1 or 2 wherein the identification of a label is carried out according to a parallel mode in which the blocks of m bits of the same row are analyzed for all the labels.

9. Method according to claim 8, wherein, in parallel mode, the analysis of a row k+1 from a row k is carried out by consecutively interrogating each serial number.

10. Method according to claim 8, wherein, in parallel mode, the analysis of a row k+1 from a row k is carried out in two phases, i.e. a first phase in which all of the labels of all of the serial numbers indicate a value of their $(k+1)^{th}$ block and a second phase in which the $(k+1)^{th}$ block is analyzed serial number by serial number if all of the labels do not have the same block at row k+1.

11. System for reading a set of electronic labels, each including an identification code of N bits, by an interrogator device, the labels and the interrogator device each comprising:
   signal emitter—receptor means linked via modulation/demodulation means to sequencing means,
   the interrogator device comprises means for analyzing each label block of m bits by block of m bits, where m is a sub-unit of N greater than 1, means for calculating, for each label, a serial number representing a number of groups of labels with a same partially identified code, a first memory intended to memorize a cross reference table between the serial numbers and the partially identified codes, a first row counter indicating the number of the group of bits being analyzed, and a second counter indicating the number of labels either totally identified or partially identified, and
   each label also comprises means for calculating the serial numbers, and a first counter to count rows of blocks of bits currently being analyzed, and a first memory to memorize said serial numbers and to store the identification code of the label.

12. System according to claim 11, wherein, said means for analyzing each label includes algorithms capable of operating according to one of two modes including:
   a sequential mode, in which the codes of blocks of m successive bits of labels are analyzed label by label by scrolling through a search tree from a row of block of bits up to a last row of block of bits for each code, and
   a parallel mode, in which the block of m bits of a same row are analyzed for all of the labels before analyzing the blocks of a following row.

13. System according to claim 11, wherein, the interrogator device operates in sequential mode, each label moreover comprising a second counter of totally identified labels.

14. System according to claim 11, wherein, the interrogator device operating in deep sequential mode comprises:
- a second memory configured to memorize multiple branch nodes of an analysis tree in the sequential mode, and
- each label comprises a second memory configured to memorize the number of the node at which the label has not been selected, and a second counter configured to count a number of totally identified labels.

15. System according to claim 11, wherein, the interrogator device, operating in parallel mode, moreover comprises:
- a third serial number counter, indicating the number of groups of labels identified in an analysis row k+1,
- a fourth serial number counter, indicating the number of serial numbers processed in each row being analyzed for the parallel mode, and wherein each label comprises:
- a second memory intended to memorize the number of groups with an identical partially identified code at an analysis row k,
- a second serial number counter intended to indicate the serial number currently being analyzed in the parallel mode, and
- a third memory intended to memorized the serial number assigned to a label during the processing of a row k in the parallel mode.

* * * * *

UNITED STATES PATENT AND TRADEMARK OFFICE
CERTIFICATE OF CORRECTION

PATENT NO. : 7,075,452 B2  Page 1 of 1
APPLICATION NO. : 10/233520
DATED : July 11, 2006
INVENTOR(S) : Robert It is certified that error appears in the above-identified patent and that said Letters Patent is hereby corrected as shown below:

On the title page, Item (54) and Column 1, the Title is incorrect. Item (54) and Column 1 should read:

-- (54) PROCESS FOR READING ELECTRONIC LABELS BY IDENTIFICATION OF THEIR CODE BY BLOCK OF BITS --

Signed and Sealed this

Nineteenth Day of September, 2006

JON W. DUDAS
*Director of the United States Patent and Trademark Office*